United States Patent [19]

Wilkes et al.

[11] 4,185,655

[45] Jan. 29, 1980

[54] SUBMERSIBLE PUMP CHECK VALVE

[75] Inventors: Robert D. Wilkes; Eugene C. Smith, both of Little Rock; David E. Ufford, Benton, all of Ark.

[73] Assignee: Jacuzzi Brothers, Inc., Little Rock, Ark.

[21] Appl. No.: 872,445

[22] Filed: Jan. 26, 1978

[51] Int. Cl.² ............................................. F16K 15/02
[52] U.S. Cl. .................................... 137/315; 137/533.17
[58] Field of Search ............... 137/315, 326, 327, 328, 137/454.4, 533.17, 533.31, DIG. 3

[56] References Cited

U.S. PATENT DOCUMENTS

| 141,309 | 7/1873 | Barnes | 137/533.17 |
|---|---|---|---|
| 1,859,916 | 5/1932 | Eickmeyer | 137/533.17 X |
| 2,564,023 | 8/1951 | Miller | 137/533.17 |
| 3,173,972 | 3/1965 | Van't Sant | 137/533.17 X |
| 3,263,701 | 8/1966 | Johnson | 137/533.17 |
| 3,474,808 | 10/1969 | Elliot | 137/327 X |

*Primary Examiner*—Robert G. Nilson
*Attorney, Agent, or Firm*—Hill, Van Santen, Steadman, Chiara & Simpson

[57] ABSTRACT

A submersible pump check valve having a housing connected to the discharge port of a submerged pump has a poppet retained by four legs operable as cantilever springs and which interact with cam surfaces within the housing to prevent removal during normal operation of the pump but to afford selective removal from the housing for cleaning or replacement of the sealing ring without removing said housing from said submerged pump. Further, the pump need not be removed or otherwise disassembled to remove the poppet.

11 Claims, 5 Drawing Figures

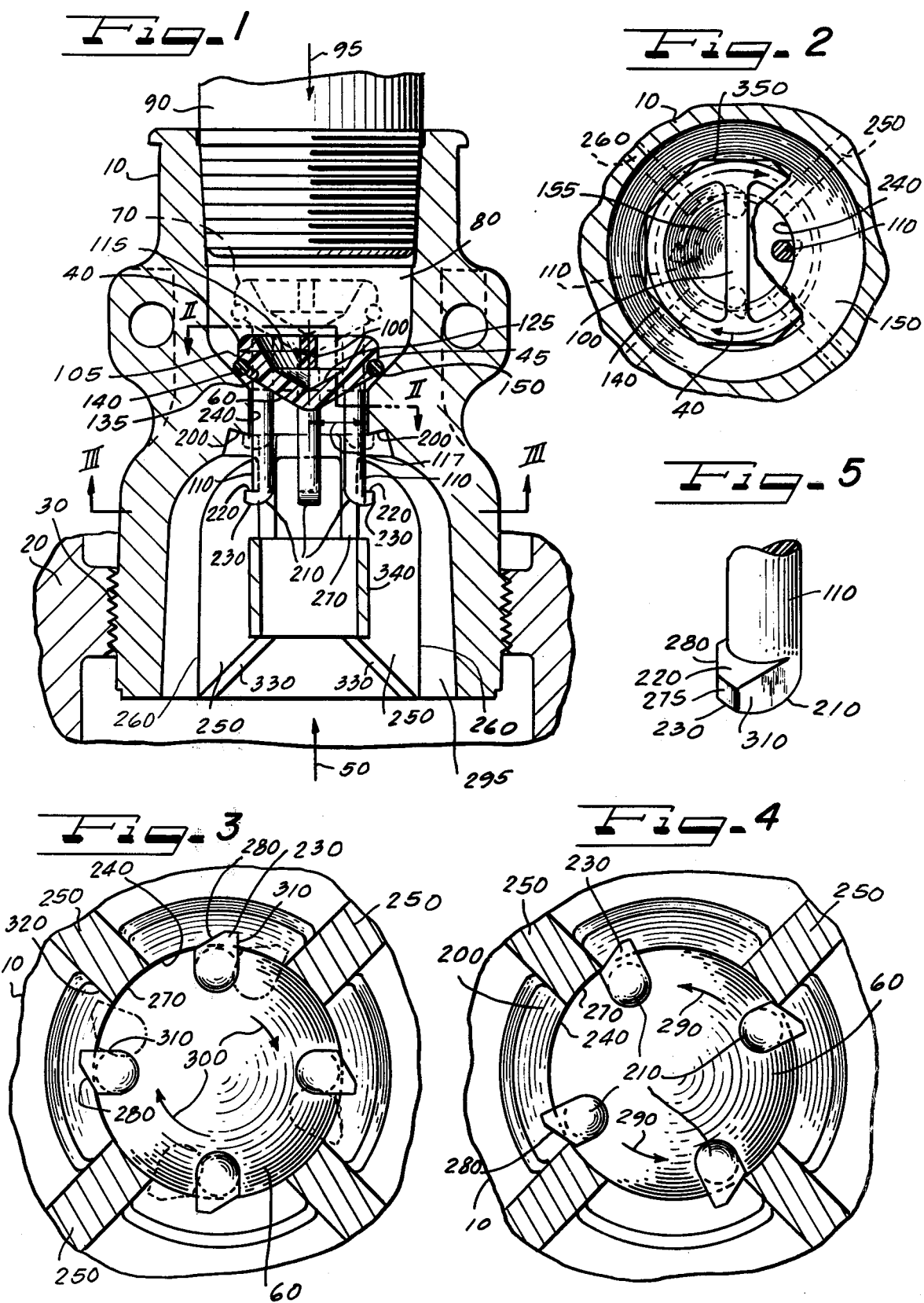

SUBMERSIBLE PUMP CHECK VALVE

BACKGROUND OF THE INVENTION

1. Field of the Invention

This invention relates to submersible pumps and more specifically to a check valve for such an apparatus.

2. The Prior Art

When water wells are new, debris resulting from the well drilling operation will be dispersed throughout the well. This debris is primarily residue of the drilling lubricant and cooling medium, that is, drilling mud and stray trash from both the surface and penetrated soil. Examples of such debris are small root pieces and pine needles. Eventually, such debris will either settle or be pumped out. However, their presence in a new well poses a threat to proper operation of a submersible pump check valve, which is particularly subject to stringy debris impairing its ability to close.

In the case of the check valve being restrained from closing, one solution is to pull the pump from the well, clean the check valve, and lower the pump back into the well for continued operation. This procedure has been practiced extensively and check valves intended for this service have been made with this function in mind. The manufacture or design of prior art pump check valves has been such that while the poppet may be removed it is necessary first of all to pull the pump from the well, clean the check valve and/or replace the entire pump and lower the pump back into the well for continued operation. The prior art has contemplated that removal of the poppet would allow replacement of a worn sealing member in lieu of discarding an otherwise useable pump.

Because of the necessary machining costs involved, the manufacture of check valves in the prior art has been more expensive than desirable.

SUMMARY OF THE INVENTION

In accordance with the present invention a check valve is provided for a submersible pump which has a check valve housing mechanically mounted on the output port of the pump. The housing is hollow so that a flow path exists between inlet and outlet ports in the housing. It is specifically contemplated that the flow path have a restriction substantially perpendicular to the direction of flow at a given point within the housing. A poppet has insertion means which cooperate with the restriction to allow said poppet to be selectively inserted into or removed from the housing through one of the ports without removing said housing from the pump or without removing the submersible pump from its point of utilization.

BRIEF DESCRIPTION OF THE FIGURES

FIG. 1 is a cross-sectional view of a submersible pump having a check valve embodying the principles of the present invention;

FIG. 2 is a fragmentary cross-sectional view taken on line II—II of FIG. 1;

FIG. 3 is an enlarged fragmentary cross-sectional view taken on line III—III of FIG. 1;

FIG. 4 is a view similar to FIG. 3 wherein the poppet has been partially rotated for removal;

FIG. 5 is a fragmentary enlarged isometric view of the end of a poppet retaining leg showing additional details of the invention.

DESCRIPTION OF THE PREFERRED EMBODIMENT

While the principles of the present invention find a particular utility in a submersible pump, it will be understood that the check valve arrangement of the present invention may be utilized in other combinations. By way of exemplary disclosure of the best mode of practicing the invention, there is shown generally in FIG. 1 a portion of a submersible pump with which the check valve assembly of the present invention is combined. A housing 10 is mounted on the discharge port of a submersible pump 20 by threads 30 or by any other convenient means. Within the housing 10 is a poppet 40 shown in its closed position 45. As the pump 20 forces water in the direction of flow indicated by the arrow 50, the water applies pressure on a bottom surface 60 of the poppet 40 forcing it upward into an open position 70 shown in dotted lines. When the poppet 40 is in the position 70, water flows into the upper chamber 80 of the housing 10 and is then forced out of the top of the chamber 80 into a pipe 90 transporting it to the surface. When the pump 20 is turned off, water ceases to apply pressure to the bottom 60 of the poppet 40. The weight of the water above the poppet 40 then forces the poppet to move from position 70 to its closed position 45 shown in full lines wherein the valve checks the flow of water back through the pump 20 in a direction indicated by the arrow 95.

The poppet 40 is made of a material such as Novyl No. 731-201 and comprises three integral but separately indentifiable parts, a removal web 100, a body portion 105 and four legs 110. The body 105 is an integral part of the removal web 100 and the legs 110. The body has a generally cylindrical shape with a radius 115 somewhat larger than a radius 117 at the neck of the housing 10. The top of the body 105 has a depression 125 to facilitate gripping the removal web 100 for removal or reassembly. On the exterior surface of the body 105 of the poppet 40 is a groove 135 wherein is mounted an O ring 140. The O ring 140 forms the seal between the poppet 40 and the housing 10 by bearing against an angularly inclined circumferentially extending valve seat surface 150 of the housing 10 when the water pressure pushing in the direction 95 against the surface of the depression 125 of the poppet 40, when the pump 20 is not running, forces the poppet 40 from position 70 to position 45.

The bottom surface 60 of the poppet 40 is disposed at a slight angle with respect to the direction of travel 50 of the water through the housing 10. This angle is such that one component of the force exerted by the flow of water in the direction 50 lifts the poppet 40 straight up from position 45 to position 70. The second component of said force deflects the water along the bottom surface 60 of the poppet 40, past the O ring 150 and out the chamber 80 of the housing 10. When the poppet 40 reaches position 70, retaining means comprising legs 110, which are capable of functioning as relatively stiff cantilever springs and which are affixed to the surface 60 of the poppet 40, engage the surfaces 200 of the housing 10 and block any further motion in the direction 50. The four legs 110 are spaced equally around the perimeter of the base 60 of the poppet 40 and their axes are parallel to the direction 50. The shape of the legs 110 is cylindrical except for the lower portion of each leg 110 which has a foot 210 perpendicular to the cylindrical body of each of the legs 110. The foot 210 associated with each leg 110 has several cam surfaces thereon. Surface 220 of each leg 110 engages surface 200 of the housing 10 to block further travel in the direction 50 by the poppet 40 once position 70 has been reached. The cam surface 230 along the bottom of the foot 210 associated with each leg 110 is used during assembly. To reinstall the poppet or to install it the first time, the poppet 40 is inserted into the housing 10 through the chamber 80 with the feet 210 of the appendages or the legs 110 being inserted first. The poppet 40 is pressed into the housing 10 in the direction 95 by gripping or pressing on the web 100. When the surface 230 of each of the lugs or feet 210 engages the surface 150 of the housing 10, the cam action of the surface 230 against the surface 150 causes each of the feet 210 on the legs 110 to retract slightly allowing each of the feet 210 to pass through the shoulder or constricted neck 240 of the housing 10. Once through the restricted neck 240, the feet 210 on the legs 110 no longer are retracted by the constricted neck 240 bearing on the cam surface 230 on each of the legs 110. The legs 110 then return to their original positions, essentially parallel to the direction 50. The poppet 40 has at this point been inserted to position 70 so that any attempt to remove it again by moving it in the direction 50 results in the cam surfaces 220 of each leg 110 engaging the surfaces 200 out into the wall of the housing 10 immediately below the constricted neck 240 of said housing 10. Thus, the poppet 40 is fully assembled.

In order to provide a means whereby the poppet 40 may be removed from the housing 10 for servicing and cleaning, four webs 250 are disposed radially about the interior of the housing 10 and below the constriction 240. The webs 250 join the housing 10 at the interior wall 260 and each has a cam surface 270 extending radially out away from the interior wall 260 and oriented in the general direction of the cam surfaces 275 of the legs 110 extending down from the poppet 40. Each of the cam surfaces 270 is disposed to engage with a cam surface 280 which is located on the foot 210 of each of the legs 110.

For removal purposes the poppet 40 is gripped by the web 100 and it is rotated in the direction 290. As the poppet 40 is rotated in the direction 290, each of the cam surfaces 280 on the foot 210 of the leg 110 engages a corresponding cam surface 270 on each of the webs 250 to again cause the legs 110 to function as relatively stiff cantilever springs and retract the feet 210 adequately so that the poppet 40 may be removed from the housing 10. This is accomplished by rotating the poppet 40 so that the surfaces 280 on the legs 110 engage the surfaces 270 of the webs 250. When the surfaces 280 engage the surfaces 270 the legs 110 are forced to retract toward the center of the housing 10 such that the surface 220 on the foot of each of the legs 210 will no longer engage the surfaces 200 on the interior of the housing 10. It is the engagement of the surfaces 220 against the surface 200 on the housing 10 which locks the poppet 40 from being withdrawn at any other time. In this one condition of having rotated the poppet 40 in the direction 290 the legs 110 are forced to retract so that the surfaces 220 do not engage the retaining surfaces 200. The poppet may then be extracted by pulling straight up as indicated in the direction of the arrow 50 for cleaning and/or replacement and reinsertion.

The rotation of the pump 20 causes the water in the cavity 295 of the housing 10 to move in a direction of rotation indicated by the arrow 300. As a result the cam surfaces 310 associated with each of the feet 210 of the legs 110 are constructed so that when the poppet tends to rotate in the direction 300 indicated by the arrow the cam surfaces 310 will engage the cam surfaces 320 of the webbings 250 and thereby block any further rotation by the poppet 40. Only by rotating the poppet in the direction 290 will the cam surfaces 280 engage the cam surfaces 270 to allow the poppet 40 to be extracted. Since the normal direction of rotation when the pump is running 300 is counter to the required direction of rotation to cause the legs 110 to be retracted so that the poppet 40 may be removed, the surfaces 310 on the feet 210 of the legs 110 will engage the surfaces 320 on the webs 250 of the housing 10 and will be retained in that position until selectively actuated in the direction 290 for removal.

The lower surfaces 330 of the webs 250 cooperate with the camming surface 270 of the webs 250 to support a cylindrical pump bearing 340. The pump bearing 340 is located below the bottom of the legs 110 so that there is no interference between the poppet 40 moving up and down and said pump bearing 340.

Referring to FIG. 2 in connection with FIGS. 3 and 4 the poppet 40 has an eight sided shape 350 to facilitate removal. FIG. 3 indicates the condition with the pump 20 pumping water and producing a rotational vector in the direction 300 such that the poppet 40 is rotated in the direction 300 until the surfaces 310 on the feet 210 of the legs 110 engage the surfaces 320 of the webs 250 upon the housing 10. At that point the rotation of the poppet 40 ceases. FIG. 4 discloses the condition wherein the poppet has been rotated in the direction 290 which is the direction for removal and the surfaces 280 on the feet 210 of the legs 110 are engaging the surfaces 270 on the webs 250 of the housing 10 such that the feet 210 are caused to retract adequately so that the surfaces 220 upon the base 210 of the feet 110 will no longer engage the surfaces 220 of the housing 10 to retain the poppet in position. At this point the poppet may be removed by lifting straight up in the direction 50 as indicated in FIG. 1. FIG. 4 also indicates the relationship of the base 60 of the poppet 40 to the legs 110.

The passage through the housing 10 composed of the upper or output chamber 80, the restriction 240 and the input chamber that supports the webs 250, permits flow of the water in the direction 50 from the input port to the housing 10, past the restriction 240 to the top or output port of the housing 10 and into the delivery pipe 90.

Although various modifications might be suggested by those skilled in the art, it should be understood that I wish to embody within the scope of the patent warranted hereon all such modifications as reasonably and properly come within the scope of my contribution to the art.

We claim as our invention:
1. A check valve for use with a pump comprising:
a housing through which a fluid is to freely flow in only one direction mechanically mountable on the output port of a pump;
said housing having a first and a second port connected by a passage so that there exists a path for the fluid through said housing joining said ports;
said path having a restriction substantially perpendicular to said one direction of flow through said passage at a given point within said housing;
a poppet movably mounted in said passage, adjacent to and cooperative with said restriction to permit flow of the fluid in said one direction through said passage from said first port to said second port and to block flow of the fluid opposite said one direction through said passage from said second port to said first port;

said poppet having insertion means which cooperate with said restriction of said passage to slightly distort said poppet permitting said poppet to be inserted into said housing through said second port without removing said housing from the pump or without removing the pump;

said poppet having removal means which cooperate with said restriction of said passage to slightly distort said poppet permitting said poppet to be removed through said second port of said housing by rotating it in a second direction without removing said housing from the pump or without removing the pump.

2. The valve according to claim 1 with:

said housing having substantially a cylindrical shape;

said path joining said ports having substantially a cylindrical shape with an unrestricted diameter less than the diameter of said housing;

said restriction having substantially a cylindrical shape with a diameter less than the unrestricted diameter of said path through said housing.

3. The valve according to claim 1 with:

said poppet being essentially cylindrical in shape;

said poppet having a plurality of legs affixed to one side thereof;

said legs extending through said restriction and permitting limited motion by said poppet substantially parallel to the direction of flow at the point of said restriction;

said legs having retaining appendages which cooperate with said housing to limit the extent of motion of said poppet when the direction of flow through said path is from said first port to said second port.

4. The valve according to claim 3 with said poppet having removable sealing means which cooperate with said restriction in said path in said housing to inhibit flow through said path from said second port to said first port.

5. A check valve for use with a pump comprising:

a housing mechanically mountable on the output port of a pump;

a poppet;

said housing having a first and a second port and being hollow so that there exists a path through said housing joining said ports;

said first port being mechanically aligned with the output port of the pump:

said path having a restriction substantially perpendicular to the direction of flow through said path at a given point within said housing;

said poppet having insertion means which cooperate with said restriction of said path to allow said poppet to be inserted into said housing through said second port without removing said housing from the pump or without removing the pump;

said poppet having removal means which cooperate with said housing to allow said poppet to be removed from said housing without removing said housing from the pump or without removing the pump;

said poppet being operative to permit flow through said path from said first port to said second port;

said poppet being operative to block flow through said path from said second port to said first port;

said poppet being essentially cylindrical in shape;

said poppet having a plurality of legs affixed to one side thereof;

said legs extending through said restriction and permitting limited motion by said poppet substantially parallel to the direction of flow at the point of said restriction;

said legs having retaining appendages which cooperate with said housing to limit the extent of motion of said poppet when the direction of flow through said path is from said first port to said second port;

each of said legs having a first camming surface operative to engage said housing such that said poppet may be removed from said housing by rotating said poppet in a first direction;

each of said legs having a second camming surface operative to engage said housing blocking said poppet from rotating in a direction opposite to said first direction.

6. A check valve for use with a pump comprising:

a housing with an input port and an output port, a connecting path in said biasing joining said ports, and a shoulder interior to said house restricting the area of said path at at least one point;

a poppet with essentially a cylindrical shape having a top and bottom surface with a plurality of appendages attached to said bottom of said poppet;

each member of said plurality of appendages being essentially cylindrical with the axis of symmetry of said cylindrical poppet being parallel to the axes of symmetry of each of said appurtenant appendages;

said bottom surface of said poppet having means for sealingly engaging a first surface of said shoulder so as to inhibit flow through said path from said output port to said input port;

said plurality of appendages being operative to permit limited movement by said poppet in a direction substantially parallel to the direction of flow past said shoulder from said input port to said output port;

each appendage of said plurality of appendages having retaining means for engaging a second surface of said shoulder to inhibit motion by said poppet in a direction essentially parallel to the direction of flow past said shoulder from said input port to said output port;

said poppet being removable from said housing by initially rotating said poppet in a first direction thereby causing a first camming surface on each appendage of said plurality of appendages to retractingly engage a camming surface interior to said housing so as to render inoperative the engagement of said retaining means of each member of said plurality of appendages with said second surface of said interior shoulder, then by withdrawing said poppet through said output port of said housing.

7. The check valve according to claim 6 wherein insertion of said poppet through said output port, said plurality of appendages first results in a second camming surface upon each member of said plurality of appendages retractively engaging a first camming surface on said shoulder, said engagement urging the free ends of each member of said plurality of appendages to retract, cantilever fashion, thereby disabling said retaining means of said appendages long enough so that said appendages may pass said shoulder before being released and becoming functional again.

8. The check valve according to claim 6 wherein said means for sealingly engaging said first surface of said shoulder comprises an O-ring removably mounted upon said bottom surface of said poppet.

9. For use in a submersible pump, an improved check valve assembly, the check valve having:
  a housing having an inlet port and an outlet port and a flow path therebetween, restriction means forming a valve seat in said flow path;
  a poppet movably mounted in said housing adjacent said restriction and operable to permit the flow of fluid from the input port to the output port and operable to sealingly close against the valve seat to block the flow of fluid from the output port to the input port the improvement comprising:
  said poppet comprising a resilient material shaped to provide a body for engaging the valve seat and integral axially extending legs operable as cantilever springs;
  said legs having feet at the ends of said legs engaging said restriction means to keep said poppet in said flow path in an open position but said feet being selectively movable out of engagement therewith by cooperative sliding interaction between said feet and selected surfaces within said housing, adjacent said restriction means, to permit removal of said poppet from said flow path through said output port by rotating said poppet in a first direction.

10. For use in a submersible pump, a check valve assembly comprising:
  a housing having an inlet port and an outlet port and a flow path therebetween, restriction means forming a valve seat in said flow path;
  a poppet insertable into said flow path through one of said ports and more specifically comprising a resilient material shaped to provide a body for engaging the valve seat and integral axially extending legs operable as cantilever springs;
  said legs having lugs at the ends of said legs engaging said restriction means to keep said poppet in said flow path in an open position but selectively movable out of engagement therewith to facilitate removal or insertion of said poppet into said flow path,
wherein said restriction means and said lugs have inter-engaging cam surfaces operable in response to rotation of said poppet relative to said valve seat in a given direction to automatically condition said legs for insertion or removal of the poppet from the flow path.

11. The invention of claim 10 wherein said poppet has a body portion formed with an actuating handle adapted to be manually grasped to facilitate actuation thereof.

* * * * *

UNITED STATES PATENT AND TRADEMARK OFFICE
CERTIFICATE OF CORRECTION

PATENT NO. : 4,185,655
DATED : Jan. 29, 1980
INVENTOR(S) : Robert D. Wilkes et al.

It is certified that error appears in the above-identified patent and that said Letters Patent are hereby corrected as shown below:

Column 6, claim 6, line 24, erase "biasing" and insert --housing--.

Column 6, claim 6, line 25, erase "house" and insert --housing--.

*Signed and Sealed this*

*Twenty-fourth* Day of *June 1980*

[SEAL]

*Attest:*

*Attesting Officer*

SIDNEY A. DIAMOND

*Commissioner of Patents and Trademarks*